US010108662B2

(12) United States Patent
Lee et al.

(10) Patent No.: US 10,108,662 B2
(45) Date of Patent: Oct. 23, 2018

(54) UNIT CONVERSION IN DATABASE SYSTEMS

(71) Applicant: SAP SE, Walldorf (DE)

(72) Inventors: Boyung Lee, Seoul (KR); Joo Young Yoon, Gyeonggi-do (KR)

(73) Assignee: SAP SE (DE)

(*) Notice: Subject to any disclaimer, the term of this patent is extended or adjusted under 35 U.S.C. 154(b) by 317 days.

(21) Appl. No.: 14/950,887

(22) Filed: Nov. 24, 2015

(65) Prior Publication Data

US 2017/0147665 A1    May 25, 2017

(51) Int. Cl.
*G06F 17/30*    (2006.01)

(52) U.S. Cl.
CPC .............................. *G06F 17/30442* (2013.01)

(58) Field of Classification Search
CPC combination set(s) only.
See application file for complete search history.

(56) References Cited

U.S. PATENT DOCUMENTS

2010/0049653 A1* 2/2010 Grotto ................. G06Q 20/105
 705/41
2012/0005190 A1* 1/2012 Faerber ............. G06F 17/30404
 707/718

* cited by examiner

*Primary Examiner* — Etienne Leroux
(74) *Attorney, Agent, or Firm* — Sterne, Kessler, Goldstein & Fox P.L.L.C.

(57) ABSTRACT

According to various embodiments, systems and methods for performing unit conversion operations in a database system are provided. According to embodiments, a database operation will require unit conversion. A number of unit conversions that might be required both before and after performance of the operation can then be estimated. At least some of the data entries implicated by the operation can then be converted from a first unit to a second unit depending on the result of the estimation.

20 Claims, 11 Drawing Sheets

UNIT CONVERSION IN DATABASE SYSTEMS

BACKGROUND

In database systems, data is often stored in tables as numerical data entries expressed in a particular unit. For instance, a vendor's database might maintain a table listing sales transactions that include the quantity of an item that was sold and the amount of money the item or items were sold for, expressed in some currency. From time to time, the vendor might want to convert the currency in which the sold items are expressed and might also want to perform other database operations on the table. Since the conversion of table entries as expressed in one kind of units to table entries expressed as another kind of units can be time and resource intensive, it can sometimes be desirable to minimize the number of table entries that must be converted.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for efficiently converting data stored in a database table between different units.

Figure 1:
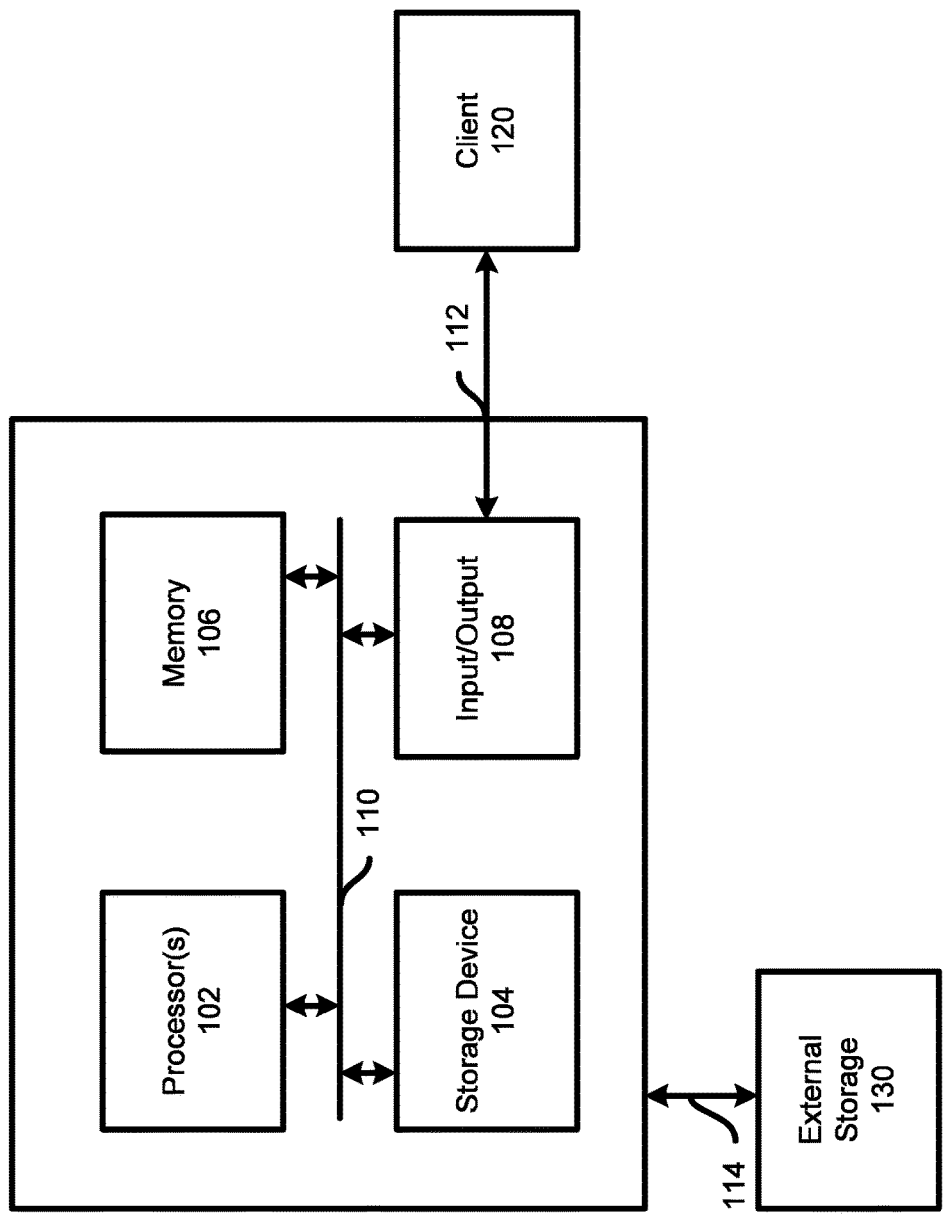
FIG. 1 is a block diagram of an in-memory database system, according to an example embodiment.

FIG. 1 is a functional block diagram of an in-memory database system 100 according to various embodiments. As shown in FIG. 1, the database system 100 may include processor (or processors) 102, a storage device 104, a memory 106, and input/output components 108. The processor 102 may include one or more processors capable of processing instructions for execution within the system 100. In particular, the processor 102 is capable of processing instructions stored in the storage device 104 and/or the memory 106. Storage device 104 may comprise any appropriate mass storage device such as a hard drive or solid state memory. Memory 106 may comprise any sort of appropriate memory device such as solid state memory, but can be implemented such that it allows for faster access time than storage device 104. Input/Output module facilitates communication with one or more client devices 120 via communications channel 112, which may include any appropriate communications means such as a wired or wireless network. Bus 110 can facilitate communication between the processors 102, storage device 104, memory 106, and input/output component 108. System 100 may also have an external storage component 114 associated with it. External storage component may comprise non-volatile memory such as standard hard drives, solid state memory, or the like. According to some embodiments, external storage may also include an external distributed database system.

Figure 2:
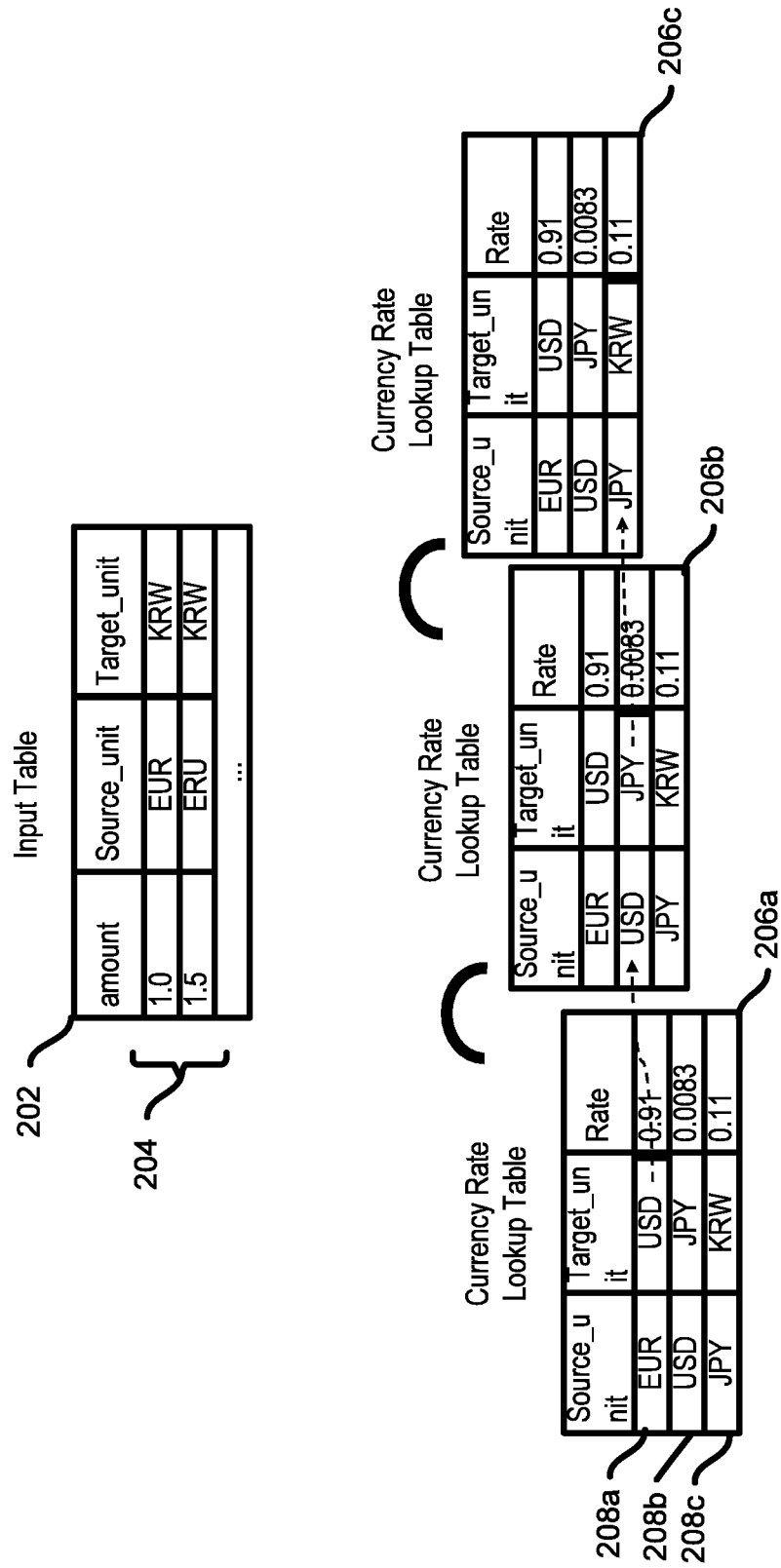
FIG. 2 depicts a number of different data tables needed for explanation of the various embodiments.

FIG. 2 depicts a number of different data tables needed for explanation of the various embodiments. As discussed above, a user of a database system might want to convert entries in the database system that are expressed in a first unit to entries expressed in a second unit. For instance, Table 202 shows that several entries 204 are stored in a "source unit" of "EUR", or Euros and that the user wants to convert the entries to a "target unit" of "KRW", or Korean Won. For brevity, only two entries of this table are shown, but tables could contain any number of entries and, indeed, any number of columns of fields in each entry. Additionally, while FIG. 2 depicts the conversion of currencies (e.g., EUR to KRW), this is just for the purpose of explanation and the methods and systems discussed below can be applied to any other kind of unit conversion (e.g., ounces to liters, inches to meters, base 10 to decibel, etc.)

In general to convert data stored in one unit to another unit, it is necessary to have a conversion rate. Conversion rates can be stored in, for instance, external storage system 130 and queried as needed (or in other embodiments storage 104 or memory 106). However, getting a conversion rate can be somewhat resource intensive in some cases. For instance, direct currency conversion rates do not frequently exist for all possible currency conversion pairs. Euros, say, might not ever be expressed in terms of Won in external storage system 130. Accordingly, to get a conversion rate from Euros to Won, a system (e.g., system 100) might have to rely on recursive self-joins of currency conversion rates stored in the system. FIG. 2 illustrates how this is accomplished.

Figure 3:
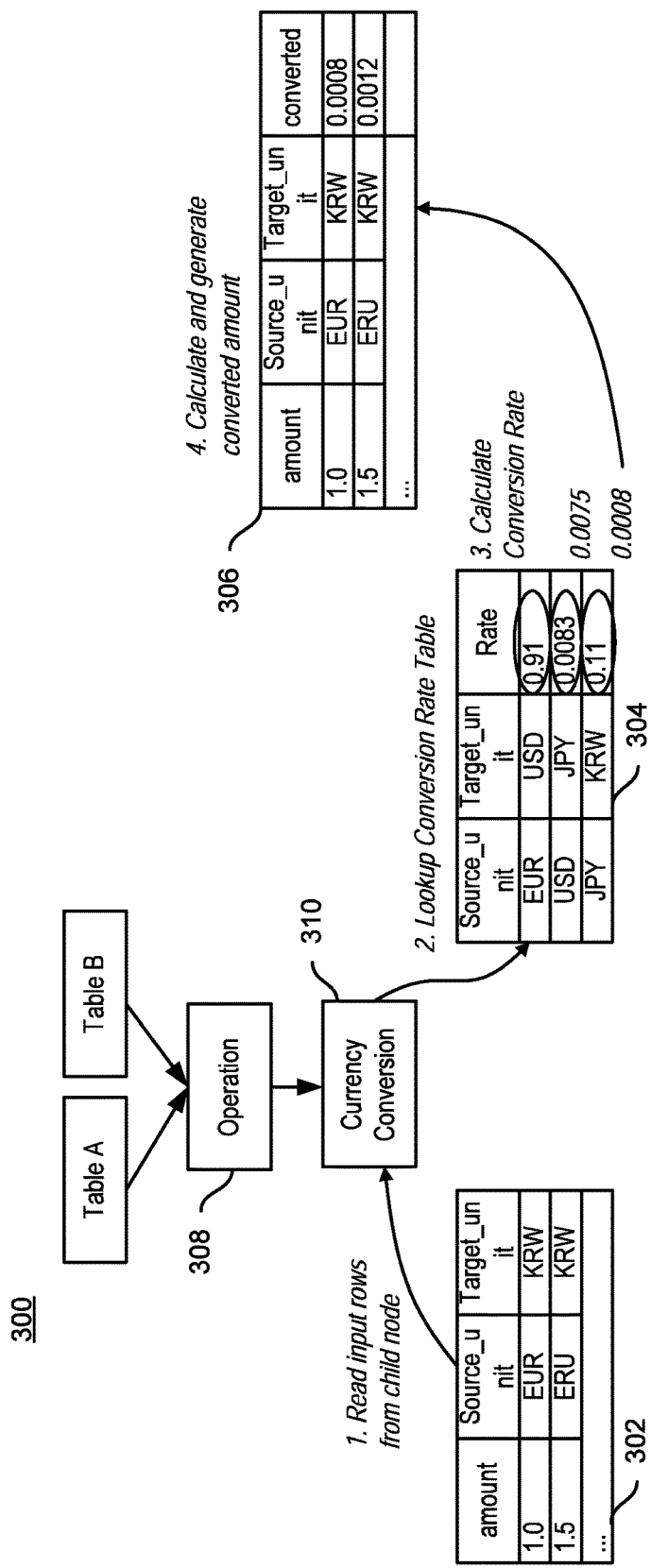
FIG. 3 a process flow according to various embodiments.

As shown in FIG. 2, a currency rate lookup table 206 (tables 206a, 206b, and 206c are depictions of the same table with different annotations) contains several currency conversion rate pairs. For instance, currency rate lookup table 206 is shown with three entries 208a, 208b, and 208c. Entry 208a shows a conversion rate of 0.91 for the conversion from "EUR" to "USD." Entry 208b shows a conversion rate of 0.0083 for the conversion from "USD" to "JPY." Entry 208c shows a conversion rate of 0.11 for the conversion of "JPY" to "KRW." There is not, however, a direct conversion rate of "EUR" to "KRW." Instead, to make this conversion, an entry 204 must first be converted from "EUR" to "USD," as shown in 206a. Next, the conversion rate from "USD" to "JPY" must be obtained as shown in 206b. Only after this conversion is obtained, can the final conversion rate to "KRW" be obtained as shown in 206c. As can be seen, obtaining the conversion rate can be time consuming and involve several steps. FIG. 3 depicts why this matters.

FIG. 3 depicts a process flow 300 very similar to that depicted in FIG. 2. That is, like in FIG. 2, FIG. 3 is showing a case where a user wants to convert data stored in "EUR" to "KRW." However, the process flow 300 in FIG. 3 has the addition of the performance of a generic operation 308 on Table A, Table B, or both in addition to the currency conversion operation 310. Below, the generic operation 308 is described in the context of a structure query language (SQL) operation, but that is just by way of example. Indeed, the generic operation 310 could include any appropriate database operation having to do with one or more entries or tables.

As discussed with respect to FIG. 2, in order to perform the currency conversion operation 308 of table 302, it is necessary to first determine the proper conversion rate using the conversion rate table 304 (i.e., table 206 from FIG. 2) and then recursively calculate and generate the converted amounts shown in table 306 using the calculated conversion rate. However, operation 308 might possibly reduce the number of entries to be converted, so it might be most efficient to wait to perform the conversion until after operation 308. An example of this is shown in FIG. 4.

Figure 4A:
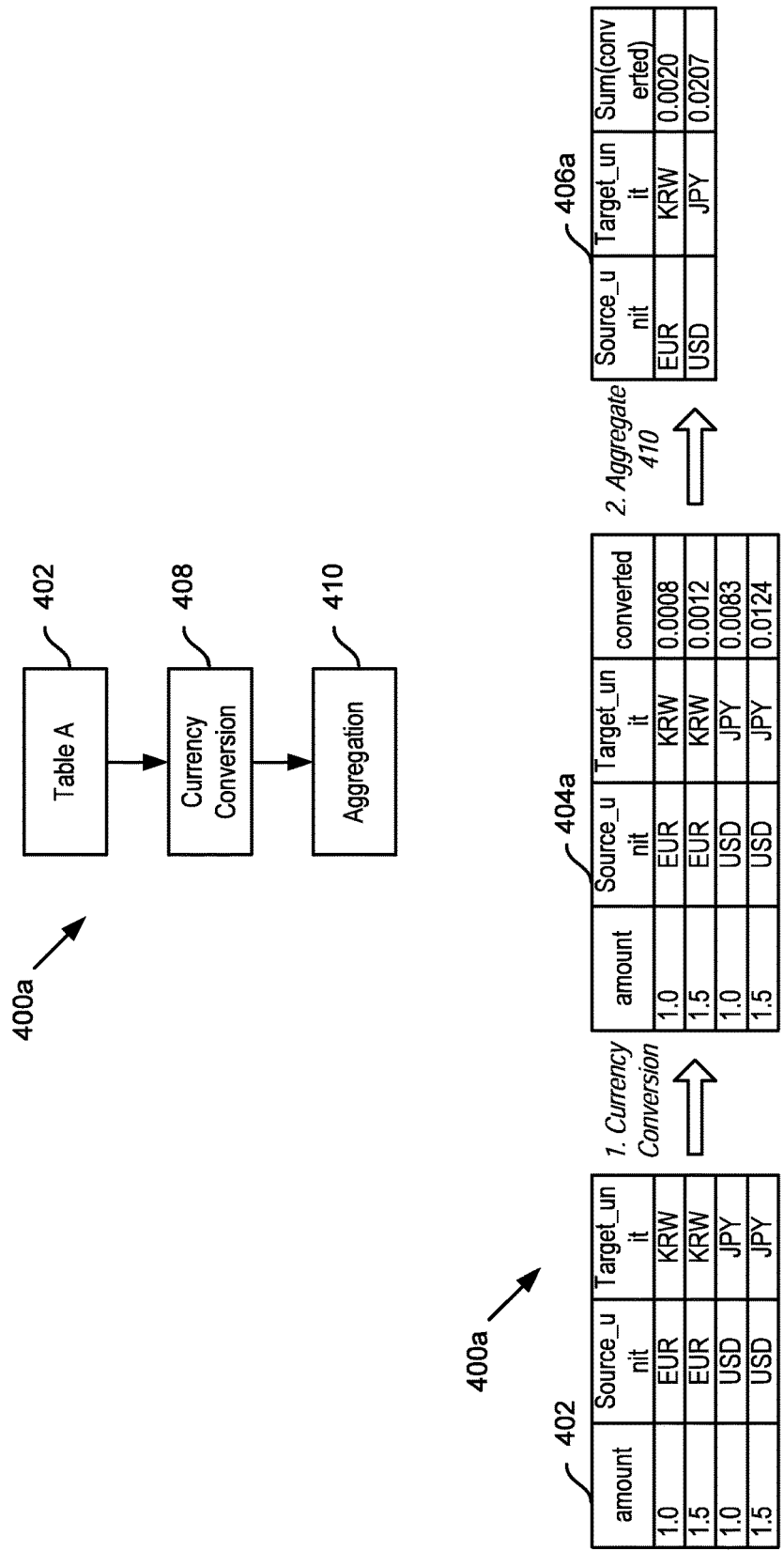
FIGS. 4A and 4B depict process flows and tables at various points during those process flows according to various embodiments.
Figure 4B:
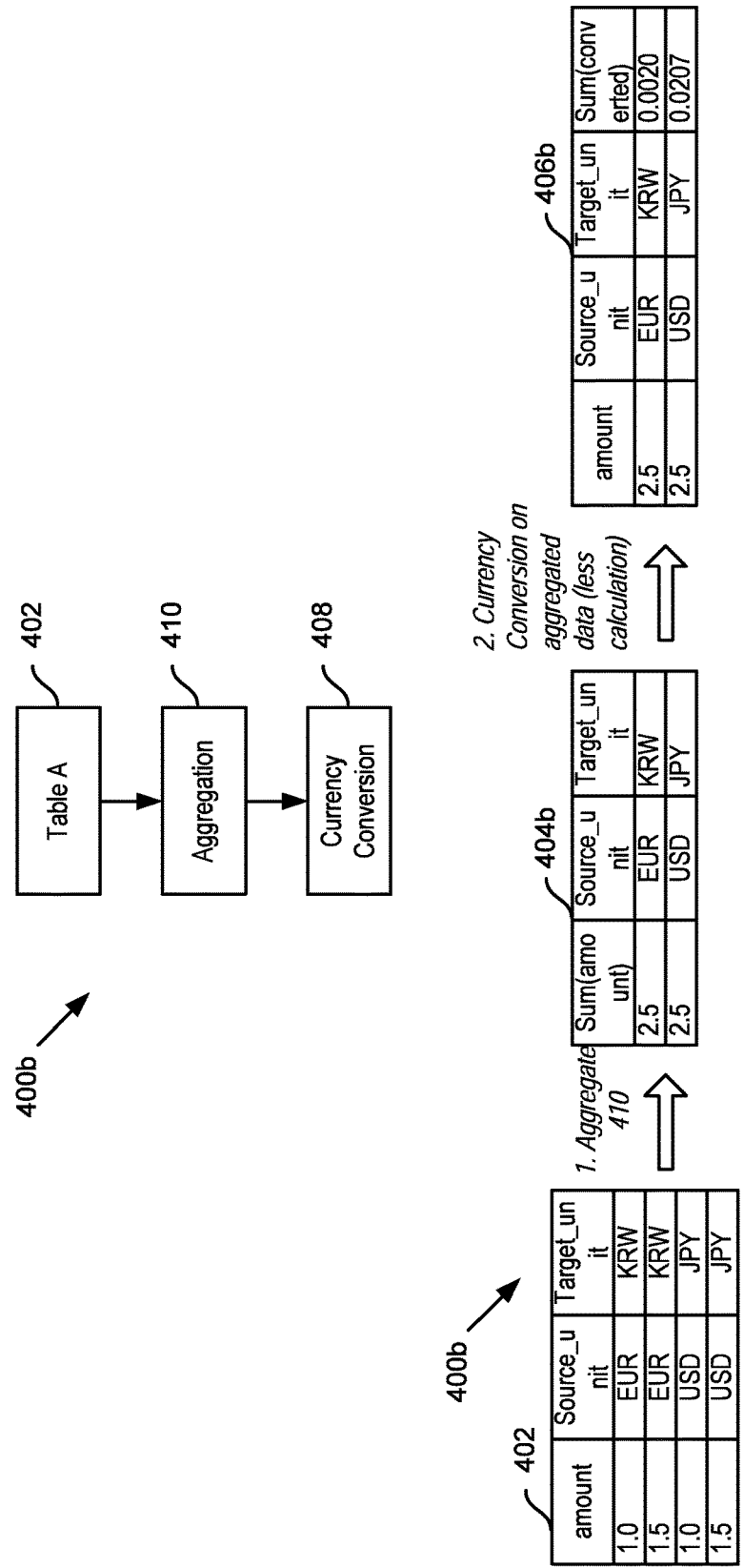

FIGS. 4A and 4B show a comparison of two process flows 400a and 400b to illustrate the advantage of placing a conversion operation 408 at differing points depending on effects of operation 308. In FIG. 4A, process flow 400a depicts a process where Table A 402 has a currency conversion operation 408 performed on it prior to a structured query language (SQL) aggregation operation 410. That is FIG. 4A depicts the process of converting several entries in table 402 in conjunction with an aggregate operation 410. As shown, table 402 with four entries in "EUR" and "USD" that the user wants to convert to "KRW" and "JPY", respectively. In process flow 400a, the currency conversion 408 occurs first so that, in table 404a each of the four entries has been converted. The aggregate function 410, aggregates like conversion pairs together, resulting in a reduction of the total number of entries in table 406a from four to 2. In process flow 400a, therefore, conversions had to be performed on a total of four entries, but only two entries were required in the end. This can be inefficient.

A better process is depicted in FIG. 4B in the form of process flow 400b, which shows the aggregate operation 410 on Table A occurring before the conversion operation 408. As shown in process flow 400b, the aggregate function 408 is performed on table 402, thereby reducing the total number of entries in table 404b to two. Accordingly, fewer currency conversion operations 408 must be performed to generate table 406b. Thus, FIGS. 4A and 4B illustrate that it can be advantageous to perform a conversion operation 408 after performing the other operation 310 when the other operation 310 reduces the number of entries that need to be converted in a table. This, however, is not always the case.

Figure 5A:
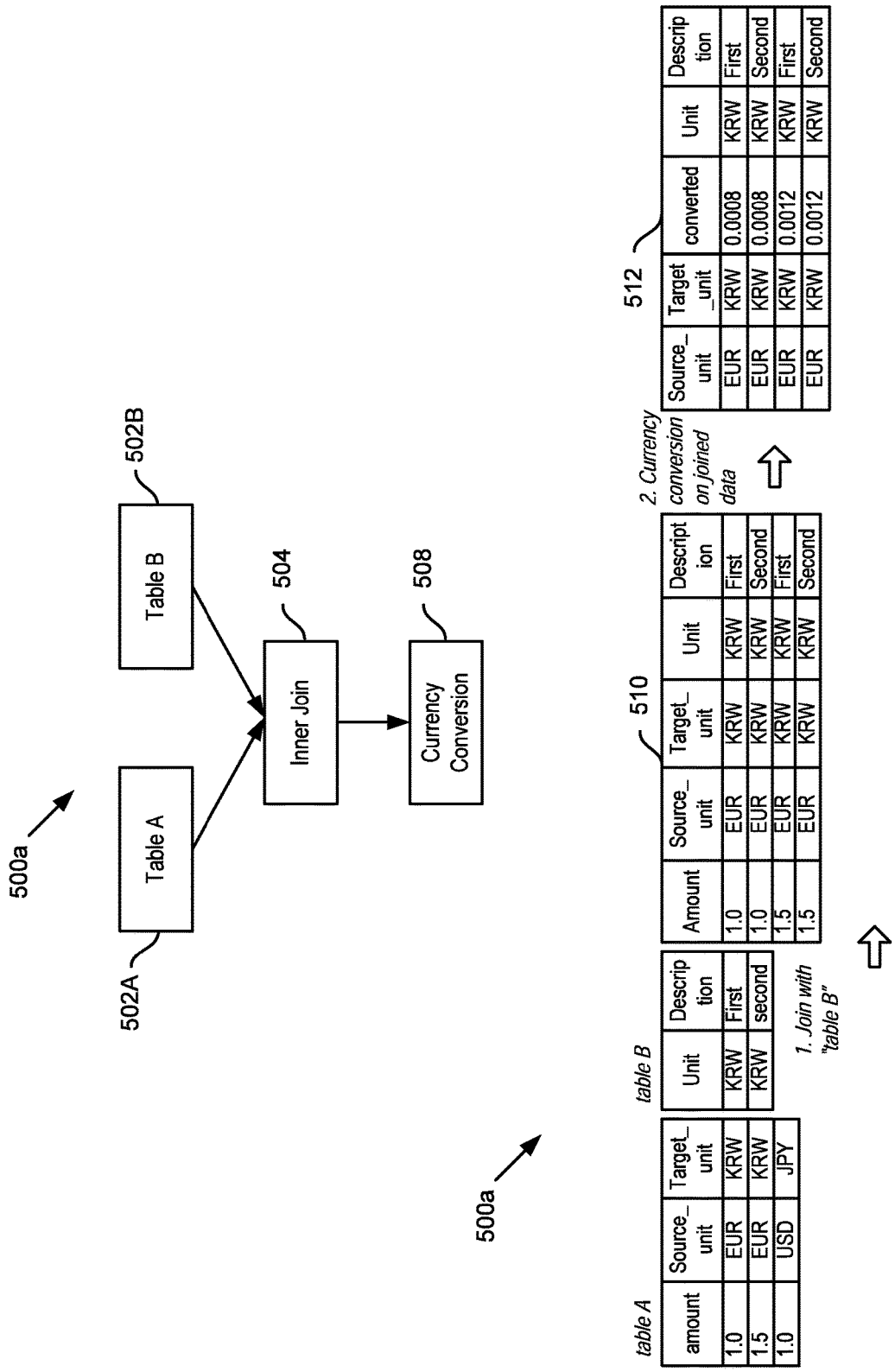
FIGS. 5A and 5B depict process flows and tables at various points during those process flows according to various embodiments.
Figure 5B:
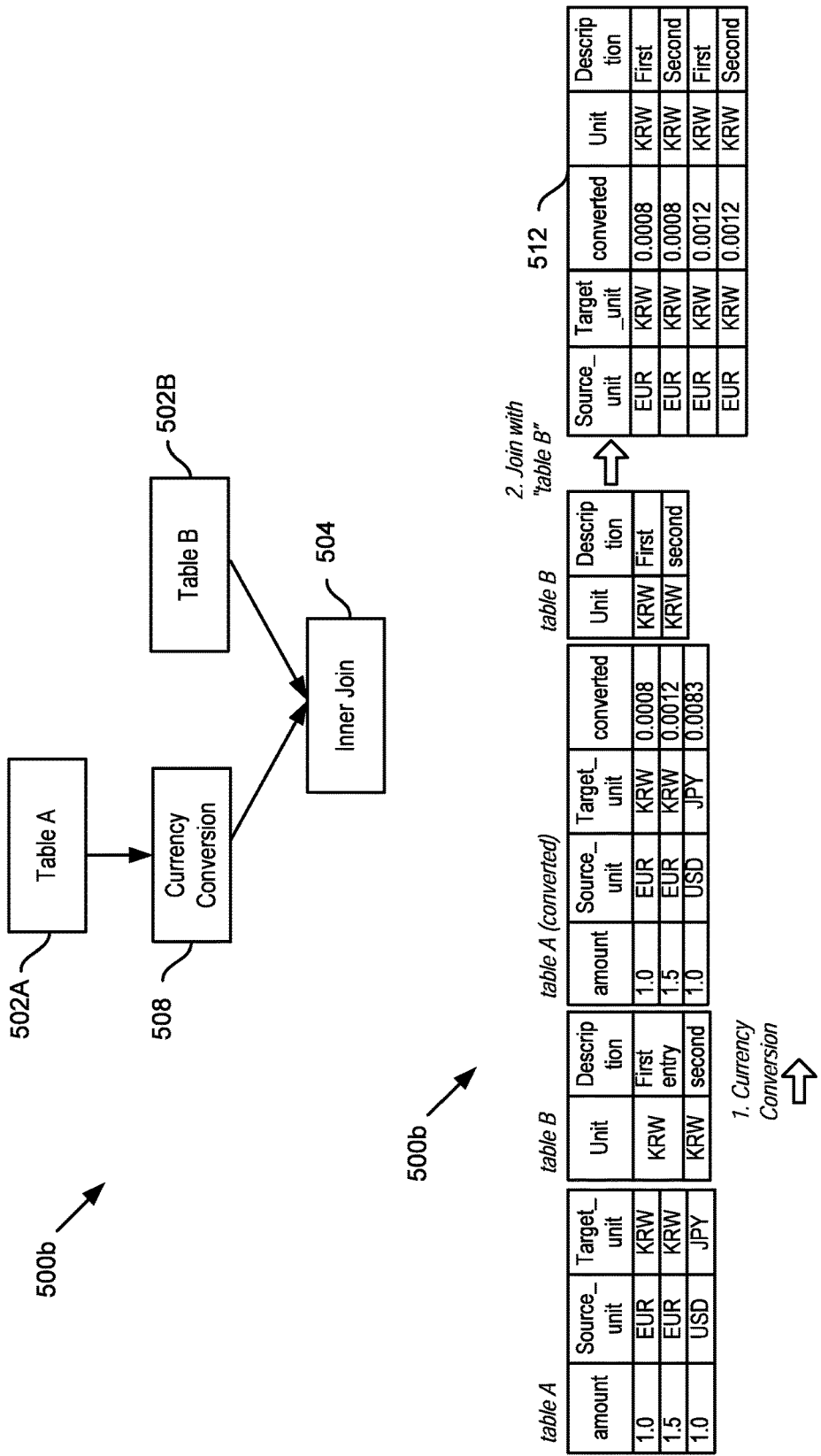

Some operations can increase the number of entries in a table. It can, therefore, be desirable to perform the conversion operation 308 before the other operation 310 in these cases. FIGS. 5A and 5B depict this scenario.

FIG. 5A depicts process flow 500a. In this process 500a, a database user wishes to perform conversion 508 the result of a SQL join operation 504 of table A 502A and Table B 502B. As shown in the FIG. 5A, Table A 502A comprises a number of entries in source units of "EUR" and "USD" and target units of "KRW" and "JPY." Table B contains entries with units "KRW" of first and second types. When the join operation 504 is performed to join table A 502A and table B 502B, the resulting table 510 contains more entries than either of table A 502A and table B 502B. If the currency conversion operation 508 is performed at this point (which it is in FIG. 5A), then each of the entries in table 510 must be converted to generate table 512.

Unlike the scenario depicted in FIGS. 4A and 4B, the other operation 308 (i.e., join operation 504 here) increases the number of entries that need to be converted. It is, therefore, desirable to perform the conversion operation 508 before the join operation 504. This scenario is depicted in FIG. 5B.

FIG. 5B depicts process flow 500b, which differs from process flow 500a in that the currency conversion operation 508 is performed prior to the inner join operation 504. Similarly to FIG. 5A, FIG. 5B depicts table A 502A, which comprises a number of entries in source units of "EUR" and "USD" and target units of "KRW" and "JPY." Table B contains entries with units "KRW" of first and second types. The conversion operation for table A 502A is performed prior to the inner join operation 504. As such the conversion operation only requires conversion of three entries from table A 502A as opposed to the four entries that had to be converted according to process flow 500a depicted in FIG. 5A. Once table A 502A has been converted according to process flow 500a, the join operation 504 can be performed to join table A 502A with table B 502B in order to generate the resulting table 512. Thus, FIGS. 5A and 5B illustrate a scenario when it is advantageous to perform conversion 310 following an operation 308.

In some instances, it may be desirable to "break up" an operation and perform the conversion in the middle. Such a scenario is described with respect to FIGS. 6A and 6B, again using the SQL aggregation operation as an example.

Figure 6A:
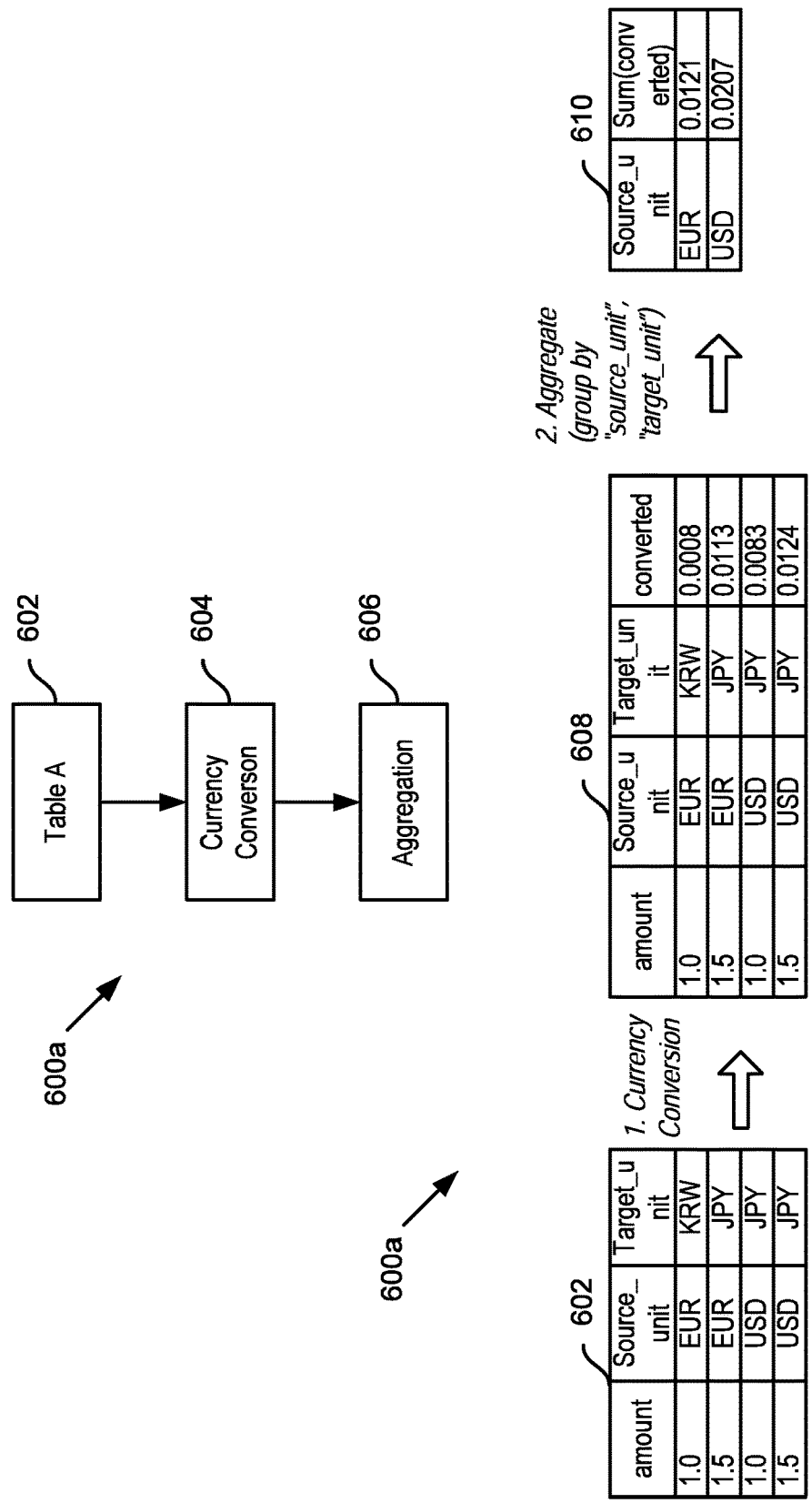
FIGS. 6A and 6B depict process flows and tables at various points during those process flows according to various embodiments

In FIG. 6A, process flow 600a depicts a process where Table A 602 has a currency conversion operation 604 performed on it prior to an aggregation operation 606. That is, FIG. 6A shows a process of converting several entries in table A 602 in conjunction with an aggregate operation 606. As shown, table 602 with four entries in "EUR" and "USD" that the user wants to convert to "KRW" and "JPY", respectively. In process flow 600a, the currency conversion 604 occurs first so that, in table 608 each of the four entries has been converted. The aggregate function 606, aggregates like conversion pairs together, resulting in a reduction of the total number of entries in table 610 from four to 2. In process flow 600a, therefore, conversions had to be performed on a total of four entries, but only two entries were required in the end.

Figure 6B:
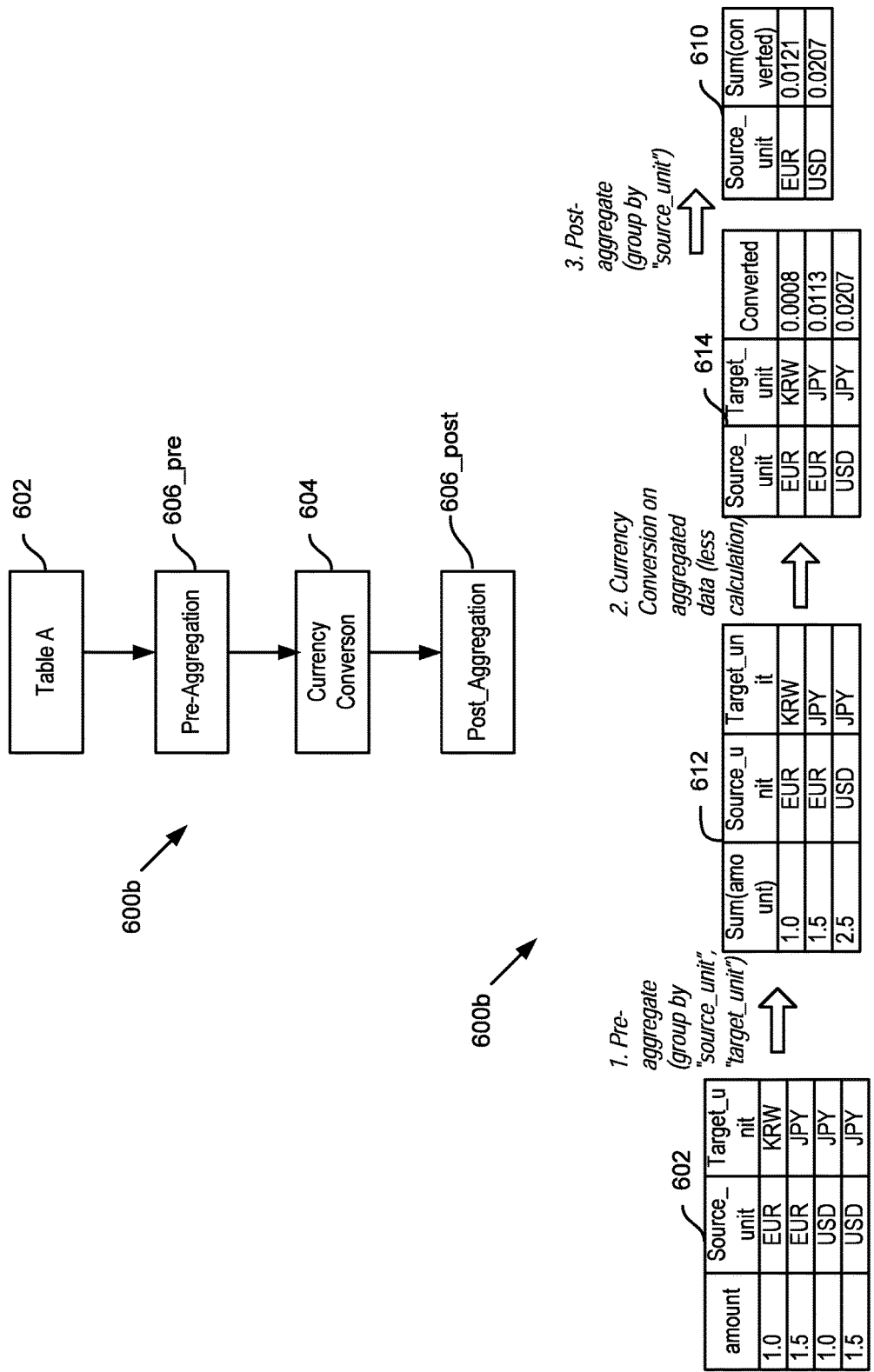

In contrast, FIG. 6B shows a process flow 600b that includes an additional "pre-aggregation" operation 606_pre. As shown in FIG. 6B, table A 602 has pre-aggregation operation 606_pre performed on it in order to generate intermediate table 612, which depicts the aggregation of like pairs. In particular, as shown in FIG. 6B, the final two entries in table 602 have been aggregated into a single entry to generate table 612, thereby reducing the total number of entries from four to three. The currency conversion operation 604 can then be performed on the pre-aggregated table 612 to generate converted table 614. The contents of table 614 can then be post-aggregated 606_post to generate table 610. Thus, as can be seen in FIG. 6B, only three (as opposed to four entries in FIG. 6B) have to be converted when the operation 310 (in this case the aggregation operation 606) is broken into two.

While FIGS. 4A-6B have been described with respect to a limited number of database structured query language (SQL) operations, it should be understood that the principles discussed are not necessarily limited to these SQL operations or to SQL operations at all. Instead, the principles are broadly applicable to situations that require conversion of data entries stored in first units to data entries stored in second units.

Figure 7:
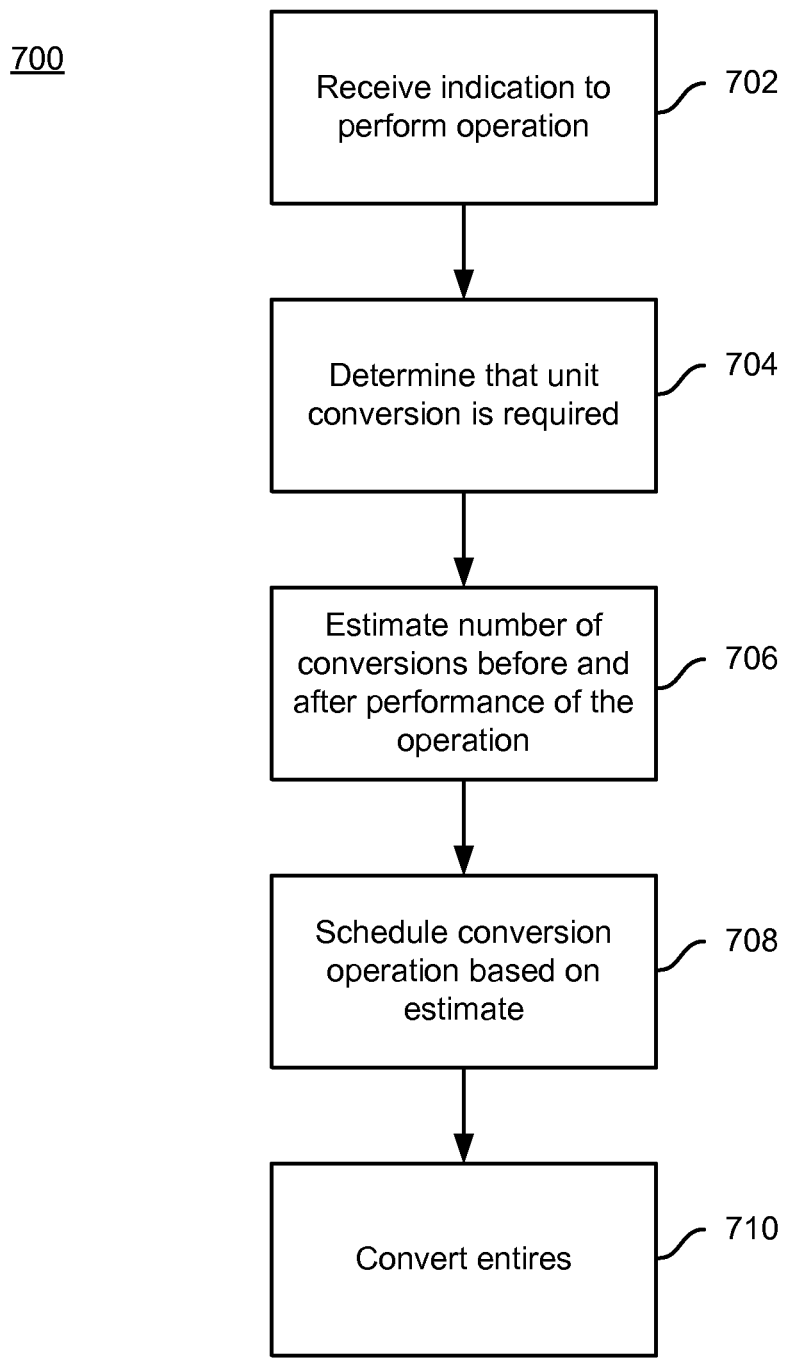
FIG. 7 is a flowchart illustrating a method for performing the various process flows according to embodiments.

FIG. 7 is a flow chart depicting a method 700 of implementing the process flows discussed above with respect to various embodiments. As shown, the method 700 begins by receiving an indication that an operation 308 is to be performed on a set of entries or tables at step 702. As discussed above, this operation could be an SQL operation or any other appropriate database operation. At step 704, the method 700 determines that unit conversion 310 is required at some point on data implicated by the operation 308 received at step 702. As discussed above, the unit conversion 310 could include, for instance, conversion from one currency to another as well as any other kind of conversion of data from one unit to another unit.

At step 706, the method 700 estimates the number of unit conversions 310 that might be required both before and after performance of the operation 308. According to some embodiments this estimate may take the form of an actual number of entries that need to be converted either before or after the operation 308. However, according to other embodiments, the method 700 might only determine whether the number of conversions will be greater before or after the operation 308 without estimating a specific number of entries that need to be converted 310.

At step 708, the method 700 schedules the conversion operation 310 at the appropriate time based on the estimate from step 706. For instance if it is estimated that the operation 310 will result in more entries that need to be converted, the method could schedule the conversion operation 308 before the operation 310 is performed. Conversely if, at step 706, the method estimates that fewer entries will need to be converted after the operation 310 is performed, then the conversion operation can be scheduled after the operation 310 is performed. At step 710, the conversion operation 310 is performed at the appropriate time.

Figure 8:
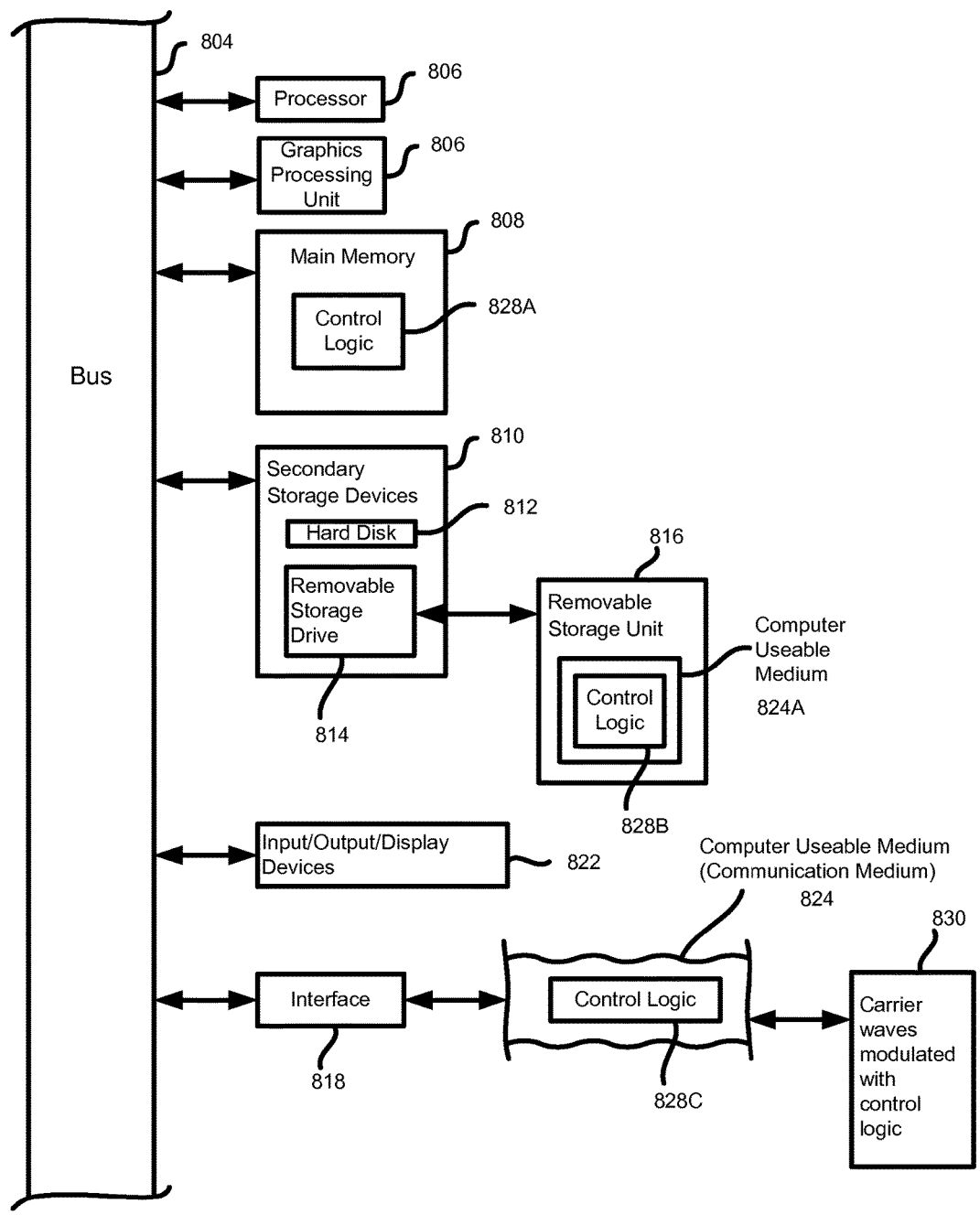
FIG. 8 is an example computer system useful for implementing various embodiments.

Various embodiments can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method of performing unit conversion operations in a database, comprising:
   determining that a database operation requires conversion of a first plurality of data rows expressed in a first unit to a second plurality of data rows expressed in a second unit;
   determining pre-operation database operations to be performed before a first performance of the database operation;
   determining post-operation database operations to be performed after a second performance of the database operation;
   determining an order for performing the database operation amongst a plurality of other database operations based at least in part on comparing a first amount of the pre-operation database operations to a second amount of the post-operations database operations; and
   converting a first individual data row of the first plurality of data rows expressed in the first unit to a second individual data row of the second plurality of data rows expressed in the second unit based on the order.

2. The method of claim 1, wherein the database operation comprises at least one of an aggregation operation and a selection operation.

3. The method of claim 2, wherein converting the first individual data row expressed in the first unit to a second individual data row expressed in the second unit based on the order, comprises:
   converting the first individual data row to the second individual data row after performance of the database operation.

4. The method of claim 1, wherein the database operation comprises a join operation.

5. The method of claim 4, wherein converting the first individual data row expressed in the first unit to the second individual data row expressed in the second unit based on the order, comprises:
   converting the first individual data row to the second individual data row before performance of the database operation.

6. The method of claim 1, further comprising:
   determining a conversion rate from the first unit to the second unit.

7. The method of claim 6, wherein the determining the conversion rate comprises a recursive self-join lookup until the conversion rate from the first unit until the second unit is found.

8. The method of claim 1, further comprising:
   converting a third plurality of data rows expressed in a third unit to a fourth plurality of data rows expressed in a fourth unit.

9. The method of claim 1, wherein the database operation is a structured query language operation.

10. The method of claim 1, wherein the conversion comprises converting a first currency to a second currency.

11. A computer system, comprising:
    a memory configured to store computer instructions; and
    one or more processors configured to execute the computer instructions and to:
    determine that a database operation requires conversion of a first plurality of data rows expressed in a first unit to a second plurality of data rows expressed in a second unit;
    determine pre-operation database operations to be performed before a first performance of the database operation;
    determine post-operation database operations to be performed after a second performance of the database operation,
    determine an order for performing the database operation amongst a plurality of other database operations based at least in part on comparing the pre-operation database operations to the post-operations database operations; and
    convert a first individual data row of the first plurality of data rows expressed in the first unit to a second individual data row of the second plurality of data rows expressed in the second unit based on the order.

12. The computer system of claim 11, wherein the database operation comprises at least one of an aggregation operation and a selection operation.

13. The computer system of claim 12, wherein the one or more processors are configured to convert the first individual data row to the second individual data row after performance of the database operation.

14. The computer system of claim 11, wherein the database operation comprises a join operation.

15. The computer system of claim 14, wherein the one or more processors are configured to convert the first individual data row to the second individual data row before performance of the database operation.

16. The computer system of claim 11, wherein the one or more processors are further configured to:
    determine a conversion rate from the first unit to the second unit.

17. The computer system of claim 16, wherein the one or more processors are configured to determine the conversion rate using a recursive self-join lookup until the conversion rate from the first unit until the second unit is found.

18. The computer system of claim 11, wherein the one or more processors are further configured to:
    convert a third plurality of data rows expressed in a third unit to a fourth plurality of data rows expressed in a fourth unit.

19. The computer system of claim 11, wherein the conversion comprises converting a first currency to a second currency.

20. A tangible computer-readable device having non-transitory instructions stored thereon that, when executed by at least one computing device, causes the at least one computing device to perform operations comprising:

determining that a database operation requires conversion of a first plurality of data rows expressed in a first unit to a second plurality of data rows expressed in a second unit;

determining pre-operation database operations to be performed before a first performance of the database operation;

determining post-operation database operations to be performed after a second performance of the database operation;

determining an order for performing the database operation amongst a plurality of other database operations based at least in part on comparing a first amount of the pre-operation database operations to a second amount of the post-operations database operations; and converting a first individual data row of the first plurality of data rows expressed in the first unit to a second individual data row of the second plurality of data rows expressed in the second unit based on the order.

* * * * *